US012332733B2

(12) United States Patent
Mcnairy et al.

(10) Patent No.: US 12,332,733 B2
(45) Date of Patent: Jun. 17, 2025

(54) DETERMINING AN ERROR HANDLING MODE

(71) Applicant: SiFive, Inc., San Mateo, CA (US)

(72) Inventors: Cameron Mcnairy, Fort Collins, CO (US); Michael Klinglesmith, Chambéry (FR)

(73) Assignee: SiFive, Inc., Santa Clara, CA (US)

( * ) Notice: Subject to any disclaimer, the term of this patent is extended or adjusted under 35 U.S.C. 154(b) by 43 days.

(21) Appl. No.: 18/142,091

(22) Filed: May 2, 2023

(65) Prior Publication Data

US 2024/0370329 A1 Nov. 7, 2024

(51) Int. Cl.
G06F 11/07 (2006.01)

(52) U.S. Cl.
CPC ........ *G06F 11/079* (2013.01); *G06F 11/0745* (2013.01)

(58) Field of Classification Search
CPC ............ G06F 11/079; G06F 11/0745
See application file for complete search history.

(56) References Cited

U.S. PATENT DOCUMENTS

| 2010/0169739 A1* | 7/2010 | Agarwal | G06F 11/1064 714/763 |
| 2017/0176535 A1* | 6/2017 | Khandelwal | G01R 31/31727 |
| 2018/0157549 A1* | 6/2018 | Han | G06F 12/0804 |
| 2019/0324422 A1* | 10/2019 | Capodanno | G06F 11/14 |
| 2023/0089736 A1* | 3/2023 | Sullivan | H03M 13/1515 714/764 |
| 2023/0185659 A1* | 6/2023 | Bao | G06F 11/073 714/764 |

* cited by examiner

Primary Examiner — Jigar P Patel
(74) Attorney, Agent, or Firm — Kilpatrick Townsend & Stockton LLP

(57) ABSTRACT

A first circuitry may have a first interface. A response circuitry having a system interface may connect to the first circuitry. The response circuitry may receive an input selection that determines an error handling mode used to respond to an error (e.g., in a lockstep system, the error could be a difference between an output at the first interface and a second output at a second interface identified by comparing the first output to the second output). In some implementations, the error handling mode may cause the response circuitry to provide the output to the system interface and send an indication to software based on detecting the error. In some implementations, the error handling mode may cause the response circuitry to contain at least a portion of the output by disabling at least a portion of the system interface for multiple clock cycles based on detecting the error.

20 Claims, 6 Drawing Sheets

DETERMINING AN ERROR HANDLING MODE

TECHNICAL FIELD

This disclosure relates generally to integrated circuits and, more specifically, to determining an error handling mode.

BACKGROUND

In some computing environments, reliability in a system must be maintained at a high level as compared to typical computing environments, such as personal computers. For example, in some applications, such as applications involving Automotive Safety Integrity Level D (ASIL D), referring to a classification of hazard defined within ISO 26262 ("Road vehicles—Functional safety"), performance may be sacrificed to maintain reliability at a required level.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
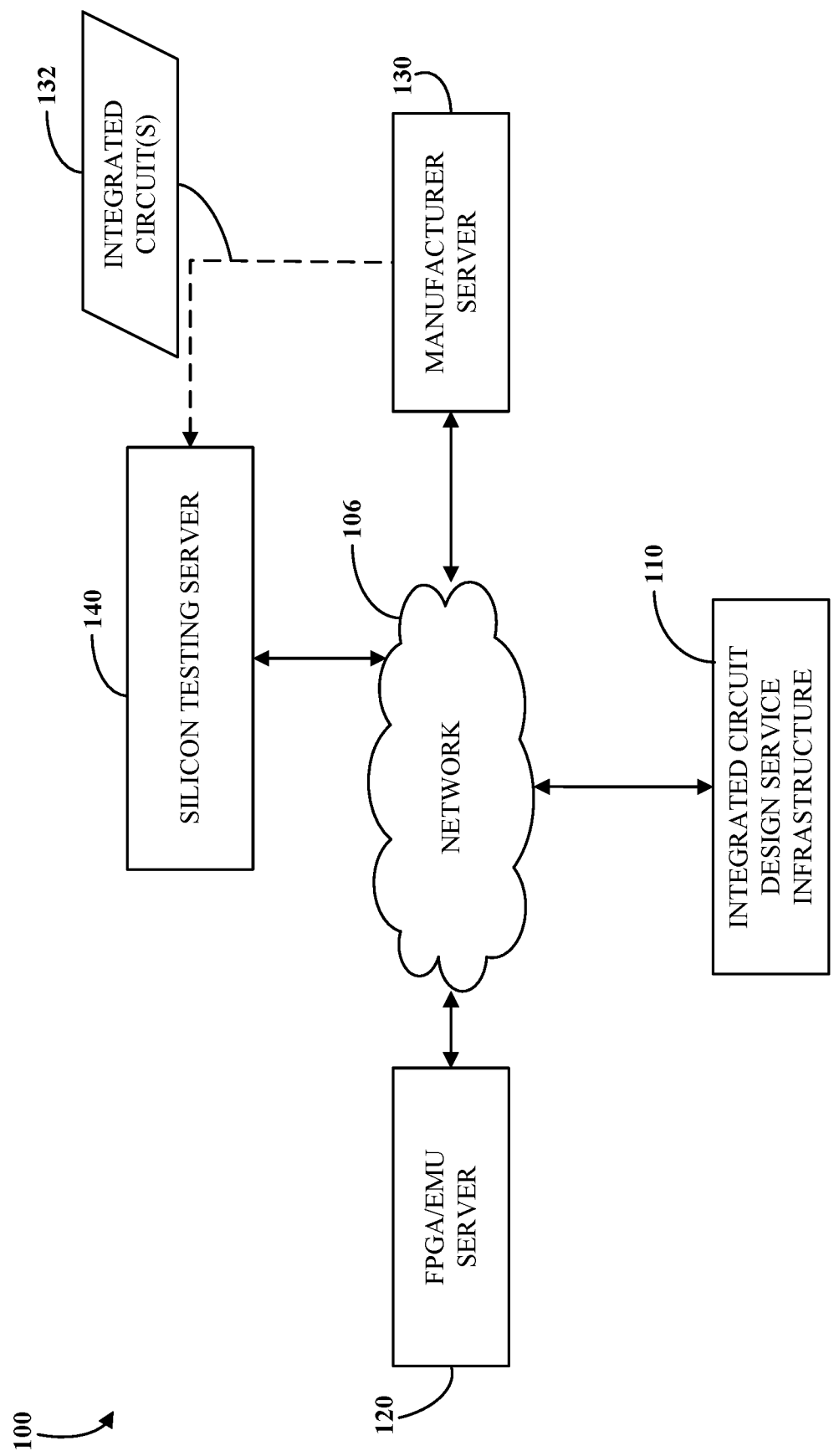
FIG. 1 is a block diagram of an example of a system for facilitating generation and manufacture of integrated circuits.

An integrated circuit may include various structures, such as processor cores including predictors, prefetchers, dispatch units, execution units, vector units, registers, queues, caches, and data paths. The structures, in turn, may comprise cells associated with particular cell types, such as flop-flops, latches, static random-access memory (SRAM) cells, and combinational gates. It is possible that the integrated circuit may have faults caused by manufacturing defects, age, or environmental conditions (e.g., excess radiation, voltage, or temperature). A fault in an integrated circuit can be activated when an application uses logic associated with the fault. An activated fault can result in one of several different error types, such as silent data corruption (SDC) where the fault is activated and unobserved, a detected uncorrected error (DUE) where the fault is activated, observed, and uncorrected, and a detected corrected error (DCE) where the fault is activated, observed, and corrected.

Given the possibility of errors, one technique for maintaining reliability is to operate multiple resources (e.g., processor cores) in lockstep. For example, a first circuitry, such as a first processor core, may be designated as a master that provides an output to a system, while a second circuitry, such as a second processor core, may be designated as a checker that checks for correctness of the output that is provided. If outputs of the first and second circuitry do not match, a circuitry connected to the first and second circuitry can indicate such a difference to the system (e.g., an error).

However, a response to an error may vary depending on the use and intent of the system. For example, in some cases it may be desirable to not provide an output when an error occurs. This may avoid propagating the error. In other cases, it may be desirable to provide an output notwithstanding the error. This can avoid a situation in which a failure to respond may cause the system to "lock" (e.g., deadlock due to a protocol violation, such as other circuitry waiting for a response that does not arrive). Designing circuitry to respond to an error according to a particular behavior that is desired (e.g., to provide or not provide an output) can limit flexibility of the system.

Implementations of this disclosure may improve flexibility of a design by enabling a response circuitry to select a particular error handling mode from multiple modes. The response circuitry can be connected to first circuitry, such as a first processor core having a first interface. In some cases, the response circuitry and the first circuitry could comprise a first node providing a first system interface among multiple nodes providing multiple system interfaces (e.g., multiple processor cores implemented by a system-on-a-chip (SoC)). In some cases, such as a lockstep implementation, the response circuitry can also be connected to second circuitry, such as a second processor core having a second interface. The response circuitry can detect an error, such as an ECC error, or in the case of lockstep, an error indicated by a difference when comparing a first output at the first interface and a second output at a second interface to check for correctness.

The response circuitry can select a mode from a plurality of modes to determine an action for when an error is detected. For example, a first mode could be "no containment mode" in which the first output is provided to a system interface along with an indication to software that enables a response to the error. The no containment mode may be useful in a situation in which an error on the interface is inconsequential (e.g., a test mode), or where a failure to respond could cause the system to deadlock due to a protocol violation. In some cases, this may be a default mode. In another example, a second mode could be a "containment mode" in which at least a portion of the first output is contained by disabling at least a portion of the system interface for one or more clock cycles. The containment mode may be useful in a situation in which it is desirable to avoid propagating an error and disabling the system interface would not cause the system to deadlock due to a protocol violation. In a further example, a third mode could be "contain with poison mode" in which the first output is provided to the system interface along with asserting a poison bit as part of the system interface's protocol for those data transfers affected by the difference. The contain with poison mode may be useful in a situation in which it is desirable to avoid propagating an error and a failure to respond could cause the system to lock. In some implementations, one mode may be implemented for one system interface while another mode is implemented for another system interface.

As a result, a system can implement modes for error handling that can flexibly change based on different applications. While some errors may be described herein in connection with a lockstep implementation by way of example (e.g., comparing a difference between the first output at the first interface and the second output at the second interface to identify a difference corresponding to an error), the disclosure herein is not limited to lockstep. For example, the errors may include other possible errors, including in a non-lockstep configuration, such as ECC errors or errors due to cosmic rays.

To describe some implementations in greater detail, reference is first made to examples of hardware and software structures used to implement a system including components that may determine an error handling mode. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and/or described in connection with FIGS. 3-8.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high-level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit (s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
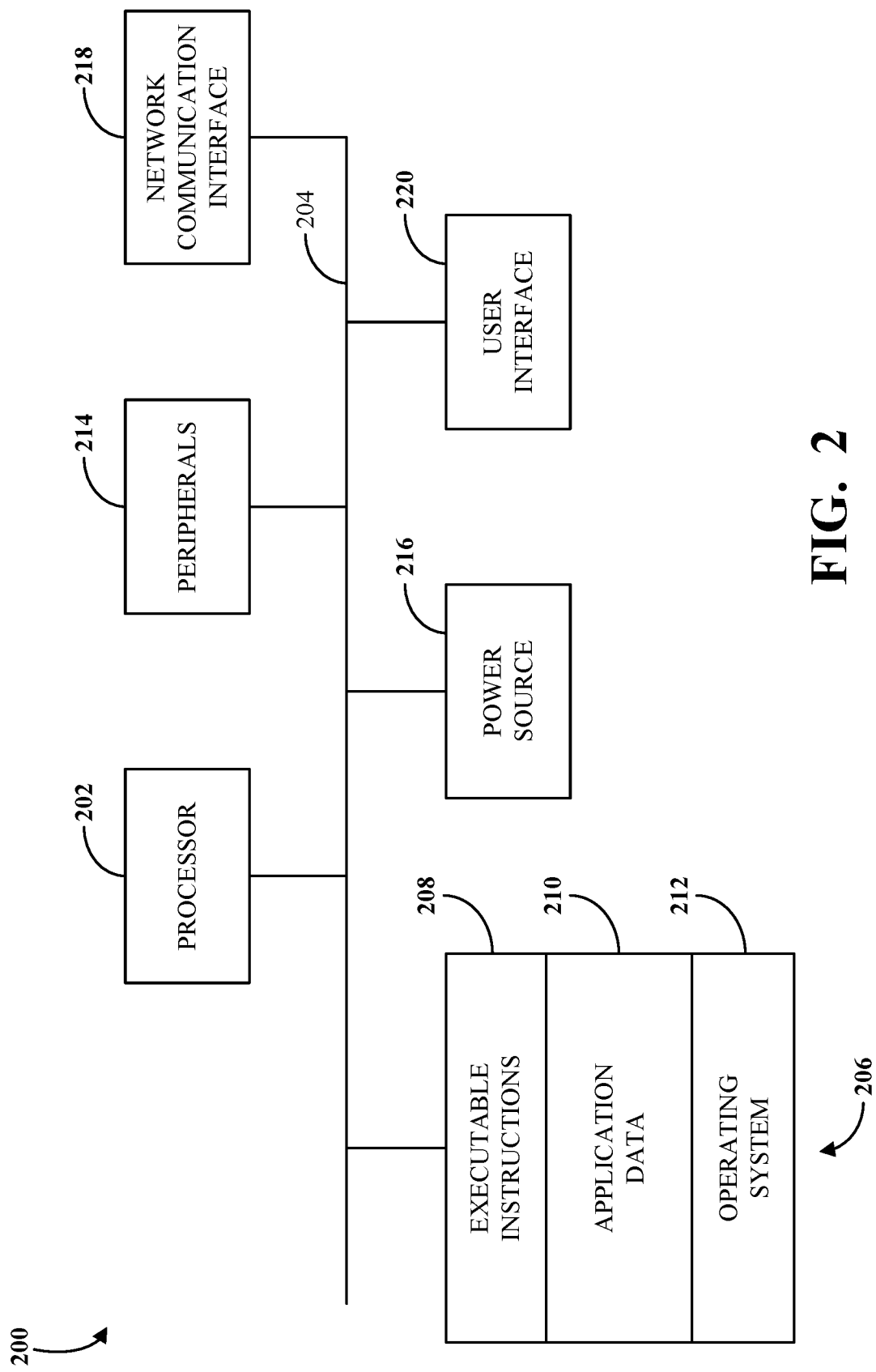
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and/or described in connection with FIGS. 3-8.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random-access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, an RTL data structure, a FIRRTL data structure, a Graphic Design System II (GDSII) data structure, a netlist, or a combination thereof. In some implementations, the integrated circuit may take the form of a field programmable gate array (FPGA), application specific integrated circuit (ASIC), an SoC, or some combination thereof. A computer may process the circuit representation in order to program or manufacture an integrated circuit, which may include programming an FPGA or manufacturing an ASIC or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
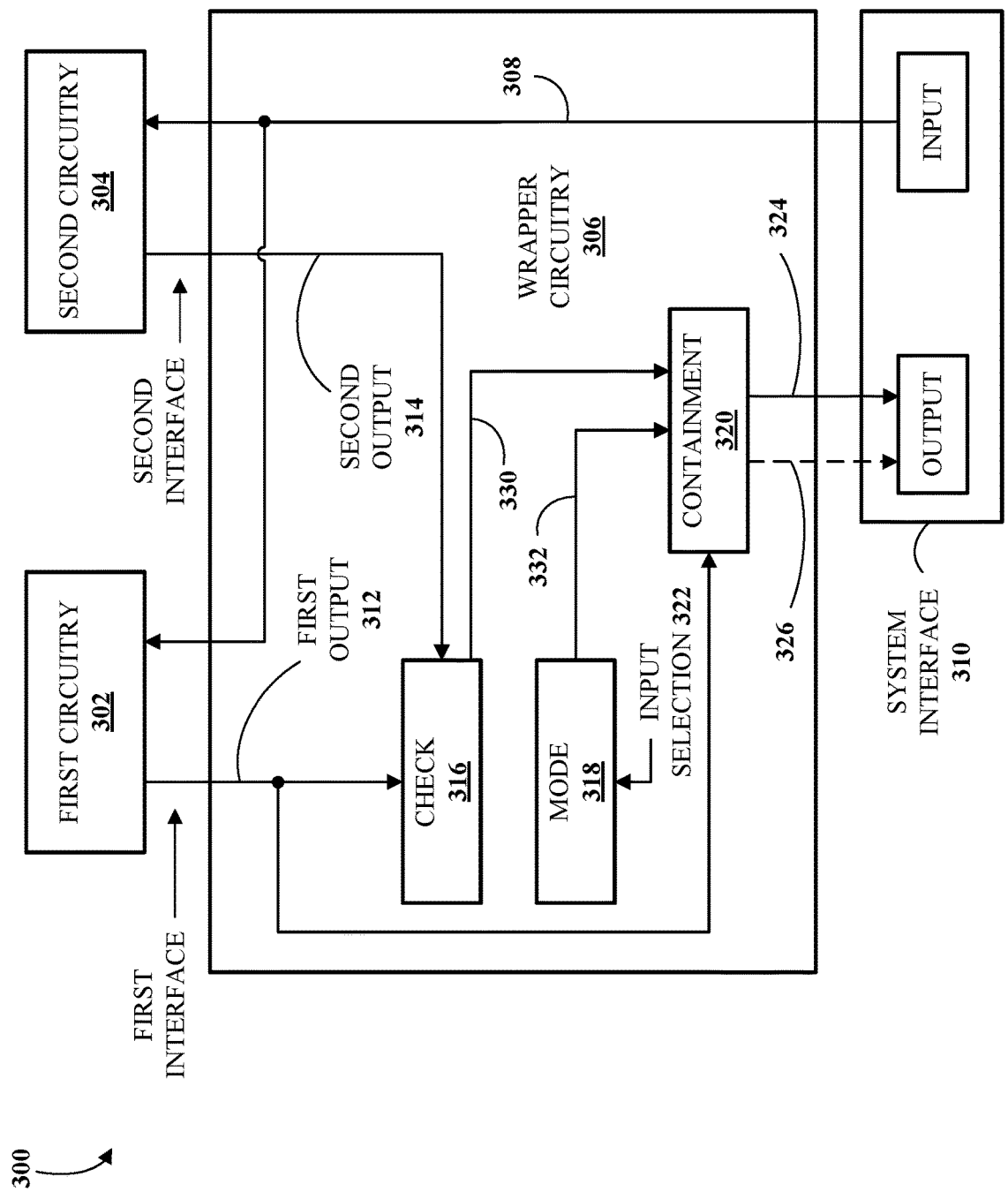
FIG. 3 is a block diagram of an example of a system for determining an error handling mode.

FIG. 3 is a block diagram of an example of a system 300 for determining an error handling mode. For case of understanding, the system 300 is shown and described as a lockstep system that may experience an error based on detecting a difference between parallel circuitry. However, the disclosure herein is not limited to lockstep and may include other types of errors, such as ECC errors and errors caused by cosmic rays.

The system 300 may include a first circuitry 302 having a first interface (e.g., for receiving an input and a generating a first output), a second circuitry 304 having a second interface (e.g., for receiving the input and generating a second output), and a response circuitry 306. The first circuitry 302, the second circuitry 304, and the response circuitry 306 could comprise a node implemented by an SoC. In some implementations, the first circuitry 302 could be a first processor core and the second circuitry 304 could be a second processor core. The first processor core and the second processor core could each include other logic, such as register files, integer units, vector units, arithmetic logic units (ALU's), encryption units, caches, queues, and data paths. In some implementations, the first processor core and the second processor core could be a first node or tile of multiple nodes or tiles implemented by an SoC. In some implementations, the first circuitry 302 could be master, and the second circuitry 304 could be a checker. For example, the first circuitry 302 could be a first processor core that is a master and the second circuitry 304 could be a second processor core that is a checker in a dual modular redundancy (DMR) system. The first processor core could perform a workload, and the second processor core could check the workload for correctness.

In some implementations, the first circuitry 302 could be a first functional unit and the second circuitry 304 could be a second functional unit. For example, the first functional unit could be a first register file, integer unit, vector unit, ALU, encryption unit, cache, queue, or data path, and the second functional unit could be a second functional unit could be a first register file, integer unit, vector unit, ALU, encryption unit, cache, queue, or data path. The first functional unit could be implemented by a first processor core, and the second functional unit could be implemented by the first processor core (e.g., the same processor core) or a second processor core (e.g., a different processor core).

In some implementations, the first circuitry 302 could be a leader, and the second circuitry 304 could be a follower. For example, the first circuitry 302 could be a first processor core, and the second circuitry 304 could be a second processor core, and the first processor core could be executing some amount of time before the second processor core. In some implementations, the second circuitry 304 could be the leader, and the first circuitry 302 could be the follower. For example, the first circuitry 302 could be a first processor core, and the second circuitry 304 could be a second processor core, and the first processor core could be executing some amount of time after the second processor core. The leader and the follower could be determined statically or dynamically in the system 300.

The first circuitry 302 and the second circuitry 304 may receive an input 308 at the inputs of their respective interfaces from the response circuitry 306. The input 308 may be a system input transmitted to the response circuitry 306 via logic connected to a system interface 310. The system interface 310 may be an interface used to communicate with the logic. For example, when the first circuitry 302 and the second circuitry 304 comprise a first processor core and a second processor core, the system interface 310 may be used to communicate with a shared cache, such as a level 3 (L3) cache, or another computing system. In some implementations, the first circuitry 302 and the second circuitry 304 may implement agents using a protocol (e.g., a cache coherence protocol), and may utilize the system interface 310 to connect with another agent using the protocol. For example, the protocol could be TileLink, a chip-scale interconnect that provides clients with coherent memory mapped access to memory and/or server devices. Thus, the first interface of the first circuitry 302 may be a first instance associated with the system interface 310, and the second interface of the second circuitry 304 may be a second instance associated with the system interface 310.

Based on the input 308, the first circuitry 302 can generate a first output 312 at the first interface (e.g., a master output at a master interface, and/or a leader output at a leader interface), and the second circuitry 304 can generate a second output 314 at a second interface (e.g., a checker output at a checker interface, and/or a follower output at a checker interface). The first output 312 and the second output 314 can each include one or more signals that are generated in response to the input 308 (e.g., a same input that is common to the first circuitry 302 and the second circuitry 304). For example, the input 308 may include one or more address, data, and/or control signals received by the first interface of the first circuitry 302 and the second interface of the second circuitry 304. In some implementations, the signals of the input 308 may be associated with a protocol, such as TileLink.

The first circuitry 302 and the second circuitry 304 can operate synchronously with one another, in lockstep, to generate the first output 312 at the first interface and the second output 314 at the second interface. For example, the first circuitry 302 and the second circuitry 304 can implement a functional redundancy check, which could include a first processor core and a second processor core executing the same routines in parallel, or a first functional unit and a second functional unit performing the same operations in parallel. The first output 312 and the second output 314 may be transmitted back to the response circuitry 306 via wiring.

In the exemplar lockstep configuration, the response circuitry 306 can utilize the second output 314 to check the first output 312 for correctness before providing the first output 312 to the system interface 310. For example, the response circuitry 306 may include a check circuitry 316 that receives the first output 312 and the second output 314. The check circuitry 316 can compare the first output 312 to the second output 314 to detect a difference (e.g., a possible source of error). The check can be performed by comparing the first output 312 to the second output 314 to detect a difference between them. The first output 312 may include results that are generated by the first circuitry 302, and the second output 314 may include results that are generated by the second circuitry 304. When in lockstep, the first output 312 should equal the second output 314, either in the same clock cycle, or predefined number of following clock cycles (e.g., such as when the first circuitry 302 is a leader executing some amount of time before the second circuitry 304, and the second circuitry 304 is a follower executing some amount of time after the first circuitry 302). For example, in some cases, the first output 312 and the second output 314 could differ in some way within a given clock cycle. For example, the first output 312 could include a "0," and the second output 314 could include a "1," when both should include a "0." The check circuitry 316 can compare the first output 312 to the second output 314 to detect this difference (e.g., to detect that the first output 312 and the second output 314 do not have the same result, corresponding to an error).

The check circuitry 316 can transmit an error detection signal 330 to containment circuitry 320 when an error is detected, such as a difference between the first output 312 and the second output 314 being detected (e.g., a difference between the first output 312 and the second output 314 at a time when the first output 312 and the second output 314 should match). While the system 300 is described in connection with a lockstep implementation that may experience an error based on detecting a difference between outputs that should be the same, the disclosure herein is not limited to lockstep. For example, the errors may include other possible errors, such as ECC errors and errors caused by cosmic rays. For example, the check circuitry 316 could transmit the error detection signal 330 to the containment circuitry 320 when other types of errors are detected in the first circuitry 302 and/or the second circuitry 304, such as an ECC error or an error caused by cosmic rays. In some implementations, the second circuitry 304 might not be present (e.g., an error could be experienced by the first circuitry 302).

The response circuitry 306 can utilize mode circuitry 318 to determine an error handling or response mode used to respond to an error, such as a difference or uncorrected error condition between the first output 312 and the second output 314 based on the difference being detected in the lockstep configuration. The mode circuitry 318 can control containment circuitry 320 (e.g., via indication of an error handling mode signal 332), to perform an action based on a trigger of the error detection signal 330. For example, the containment mode, from the mode circuitry 318, can be used to determine the portions of the first output 312 that are output to the system interface 310 (e.g., address, data, and/or control), if any, and when the portions are output to the system interface 310 (e.g., which clock cycles), based on the mode that is selected. In some implementations, the response circuitry 306 can select the particular error handling or response mode from multiple possible modes via an input selection 322 received by the mode circuitry 318. In some implementations, the input selection 322 may be determined based on a configured register setting (e.g., programming a bit in a register to determine the mode). In some implementations, the input selection 322 may be determined automatically based on the interface type associated with the system interface 310 (e.g., the response circuitry 306 detecting a particular implementation of the system interface 310, such as a protocol that is implemented, such as TileLink). In some implementations, the input selection 322 may be determined manually based on user input (e.g., receiving input through an operating system, such as Linux). Selecting the mode can determine one or more actions for responding based on the check circuitry 316 detecting a difference.

For example, the response circuitry 306 could select a first mode that is "no containment mode" (e.g., mode 1, selected via the mode circuitry 318). In the no containment mode, the containment circuitry 320 can provide the first output 312 to the system interface 310, as output 324, regardless of detecting an error (e.g., regardless of the difference, in the case of lockstep). The containment circuitry 320 can further send an indication to software that enables a response to the detection of the error associated with the data (e.g., setting a flag by writing a bit to a register when providing the first output 312 to the system interface 310). The no containment mode could enable a response without suppressing data (e.g., a null response in which there is no containment, or a disabling of the containment). The no containment mode may be useful in a situation in which an error produced on the system interface 310 is inconsequential (e.g., the first circuitry 302 and the second circuitry 304 are operating in a test mode), or where a failure to respond could cause the system to deadlock due to a protocol violation (e.g., logic utilizing the system 300 would be unable to continue without a response). In some cases, the no containment mode may be a default mode that is selected. As a result, the hardware in the system 300 can select to do nothing to contain the error, and rely on software to identify, separate, and contain potentially contaminated data. For example, the containment circuitry 320 can set a flag to trigger an external agent to initiate a control flow change (e.g., an interrupt) that terminates or stops a current workload or job associated with the error, and then restarts the workload without affecting other contexts in a coherent domain. For example, in the no containment mode, the software can search and remove potentially contaminated state.

In another example, the response circuitry 306 could select a second mode that is a "containment mode" (e.g., mode 2, selected via the mode circuitry 318). In the containment mode, the containment circuitry 320 can contain at least a portion of the first output 312 (and at least a portion of the second output 314) by disabling output to at least a portion of the system interface 310 (e.g., the output 324). The containment circuitry 320 can disable the portion of the system interface 310 for one or more clock cycles. The containment mode could enable a suppression of data based on detecting an error (e.g., detecting the difference in the case of lockstep, or an ECC error in the case of lockstep, or an ECC error in the case of non-lockstep). The containment mode may be useful in a situation in which it is desirable to avoid propagating an error, and disabling the portion of the system interface 310 would not cause a deadlock due to a protocol violation (e.g., logic utilizing the system 300, via the system interface 310, can continue without a response). For example, the containment mode may be useful when the system interface 310 is used to communicate a single cycle response (e.g., where each cycle represents an entirety of the information), or to communicate an event, such as logic implementing a wait for interrupt (WFI). In some cases, a contained transaction may inhibit forward progress at the system level. For example, a coherent domain could be compromised by a contained transaction, such as when containing a snoop response. As a result, a system can selectively determine, via the response circuitry 306, whether the containment mode may be appropriate for the system interface 310, or another mode would be better suited (e.g., such as the contain with poison mode, discussed below). In some implementations, the containment mode may be a limited containment mode in which an error can cause a containment that is limited to a predefined number of clock cycles, such as one clock cycle (e.g., the cycle associated with detection of the difference in the case of lockstep, or the ECC error in the case of non-lockstep). In some cases, the predefined number of clock cycles may be configurable. For example, the predefined number of clock cycles could be configurable by programming a bit in a register. In some cases, the predefined number of clock cycles could be configurable based on the error type and/or the application (e.g., the interface type associated with the system interface 310, such as TileLink). In some implementations, the containment mode may be a sustained containment mode in which an error causes a containment that extends through multiple clock cycles until a synchronization event occurs (e.g., starting from a cycle associated with detection of the difference in the case of lockstep, and continuing until a synchronization between the first circuitry 302 and the second circuitry 304 occurs).

In another example, the response circuitry 306 could select a third mode that is a "contain with poison mode" (e.g., mode 3, selected via the mode circuitry 318). In the contain with poison mode, the containment circuitry 320 can contain at least a portion of the first output 312 (and at least a portion of the second output 314) by providing the portion of the first output 312 to the system interface 310, as the output 324, along with asserting a poison bit 326 (or corrupt bit or indication), such as on a wire of the system interface 310 associated with the corresponding portion of the system interface 310 (e.g., the output 324). The poison bit 326 can serve as an indication of the error. The contain with poison mode, or "tainting" the data, can defer the response without suppressing data, such as by transmitting additional protocol level information that indicates the detection of the error. The contain with poison mode may be useful in a situation in which it is desirable to avoid propagating an error, and a failure to respond could cause the system to deadlock due to a protocol violation (e.g., logic utilizing the system 300, via the system interface 310, would be unable to continue without a response). For example, the contain with poison mode may be useful when the system interface 310 is used to communicate according to a multi-cycle protocol, such as TileLink (e.g., logic requesting ownership of a cache line). With the contain with poison mode, errors can be localized to a data portion of an interface that supports a poison/corrupt indication to enable an optimized response. Rather than contain the output, the poison bit can be set to indicate an error, such as a data difference in the case of lockstep, or an ECC error in the case of non-lockstep. In some cases, this can increase availability of the system. Advantageously, in the contain with poison mode, the system 300 can continue responding to an operation while deferring to other logic to determine the response. For example, the logic receiving the output 324 and the poison bit 326 could be utilizing the system 300 to perform a prefetch (e.g., fetching data from memory in advance of when the data may be used), in which case the data could simply be disregarded. In another example, the logic receiving the output 324 and the poison bit 326 could be associated with the operation of one of many virtual machines, in which case the one virtual machine associated with the error could be shut down and restarted while the other virtual machines can continue to function. As a result, availability may be improved.

In some implementations, the containment circuitry 320 can contain at least a portion of the first output 312 (and at least a portion of the second output 314) by providing a predefined output to the system interface 310 as the output 324 (e.g., in place of providing the portion of the first output 312). For example, the predefined output could be all 0's, all 1's, or another predefined pattern. In some cases, the predefined output may be configurable. For example, the predefined output could be configurable by programming a register. In some cases, the predefined output could be configurable based on the error type and/or the application (e.g., the interface type associated with the system interface 310, such as TileLink). In some cases, the containment circuitry 320 can contain at least a portion of the first output 312 (and at least a portion of the second output 314) by providing the predefined output and asserting the poison bit 326.

In some implementations, the contain with poison mode may be a limited contain with poison mode in which an error causes asserting a poison bit that is limited to a predefined number of clock cycles, such as one clock cycle (e.g., the cycle associated with the error, which could be the cycle associated with the difference in the case of lockstep). In some implementations, the contain with poison mode may be a sustained contain with poison mode in which an error causes asserting a poison bit through multiple clock cycles until a synchronization event occurs (e.g., a synchronization between the first circuitry 302 and the second circuitry 304).

As a result, a response to a detected error (e.g., a difference in the case of lockstep, or in other cases, an ECC error, or an error caused by cosmic rays) can be tailored to a particular application in a design. For example, the response could include no action, which could be appropriate when other mechanisms are available to contain the error or containment is not required (e.g., when running a workload to test functional units for correct operation, the results may not matter). Alternatively, the response could include an action to contain outputs, and may also include an interface specific options for tainting the data (e.g., asserting the poison bit in the contain with poison mode, such as when the interface uses a multi-cycle protocol such as Tile-Link).

Figure 4:
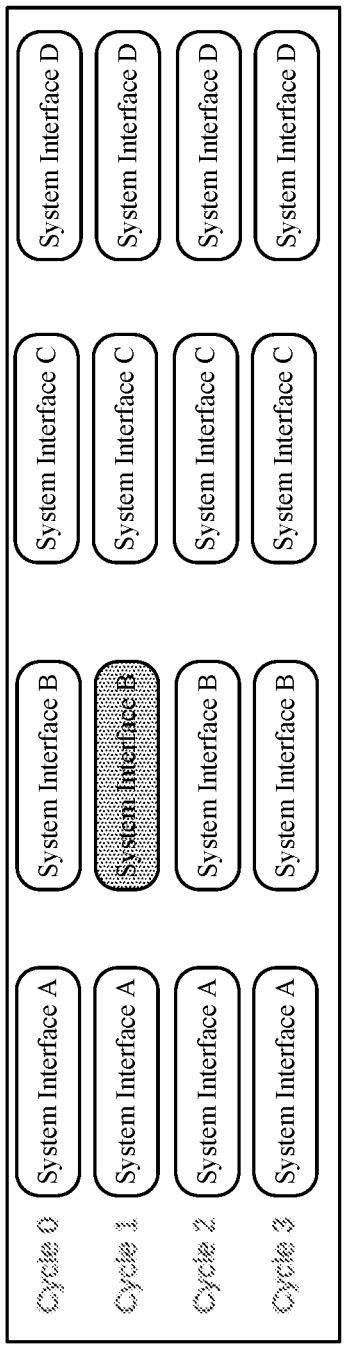
FIG. 4 is a block diagram of a first example of a system implementing error handling according to an error containment mode.

In some implementations, one mode may be implemented with respect to one interface while another mode is implemented with respect to another interface. For example, a first node comprising the first circuitry 302, the second circuitry 304, and the response circuitry 306 implemented by an SoC could select one mode (e.g., the containment mode), and a second node comprising the first circuitry 302, the second circuitry 304, and the response circuitry 306 implemented by the same SoC could select another mode (e.g., the contain with poison mode mode). As a result, the SoC can implement different modes for error handling that can flexibly adapt based on different applications. While FIG. 4 is described in connection with an error in a lockstep implementation by way of example (e.g., comparing a difference between the first output 312 at the first interface and the second output 314 at the second interface to identify a difference corresponding to an error), the disclosure herein is not limited to lockstep. For example, the errors may include other possible errors, such as ECC errors and errors due to cosmic rays, which might not involve lockstep.

FIG. 4 is a block diagram of a first example of a system implementing error handling according to an error containment mode. The first example may be for an SoC including four system interfaces, labeled system interfaces A to D. In some implementations, the system interfaces A to D may be like instances of the system interface 310. For example, system interface A could be a first system interface associated with a first node (e.g., a first instance of the system 300 having the system interface 310), system interface B could be a second system interface associated with a second node (e.g., a second instance of the system 300 having the system interface 310), system interface C could be a third system interface associated with a third node (e.g., a third instance of the system 300 having the system interface 310), and system interface D could be a fourth system interface associated with a fourth node (e.g., a fourth instance of the system 300 having the system interface 310). In some implementations, the system interfaces A to D may represent portions of the same system interface (e.g., groups of signals). For example, system interface A could be a first portion of the system interface 310 (e.g., a first byte lane of a data bus), system interface B could be a second portion of the system interface 310 (e.g., a second byte lane of the data bus), system interface C could be a third portion of the system interface 310 (e.g., an address bus), and system interface D could be a fourth portion of the system interface 310 (e.g., a control bus).

In some implementations, the system interfaces A to D may have interface identifiers associated with them. The interface identifiers may enable configuring particular ones of the system interfaces A to D to respond according to a particular error handling mode that is selected for that system interface. For example, system interface A could be configured in a no containment mode based on a first identifier, system interface B could be configured in a limited containment mode based on a second identifier, system interface C could be configured in a sustained containment mode based on a third identifier, and system interface D could be configured in a contain with poison mode based on a fourth identifier. Thus, an integrated circuit design can flexibly group or arrange system interfaces in a number of ways.

In this first example, a response may be based on a limited containment mode. At cycle 0, outputs associated with the system interfaces A to D might not have errors. For example, in a lockstep system, they may pass checks for correctness (e.g., no differences detected between outputs at master and checker interfaces for system interfaces A to D), and the response circuitry may enable the master interface(s) to be output to system interfaces A to D (e.g., transactions are uncontained). However, at cycle 1, an error, such as a difference between outputs at a master and a checker interface for system interface B, may be detected. With a limited containment mode selected for system interface B, response circuitry associated with system interface B may cause system interface B to be contained in cycle 1 by disabling system interface B associated with the error (e.g., the current transaction at system interface B is suppressed during cycle 1). The response circuitry associated with system interfaces A, C, and D may continue (e.g., they may enable master interfaces to be output to system interfaces A, C, and D based on their continuing to pass checks for correctness). Then, at cycle 2, the system interfaces A to D may again not have errors. For example, they may again pass checks for correctness, including system interface B. and the response circuitry may enable the master interfaces to again output to system interfaces A to D (e.g., the transactions resume uncontained). As a result, the limited containment mode caused a containment that was limited to a clock cycle in which the error occurred (e.g., cycle 1). In some implementations, one or more other modes may be used with respect to other system interfaces (e.g., interfaces A, C, and D), such as the no containment mode and/or the contain with poison mode.

Figure 5:
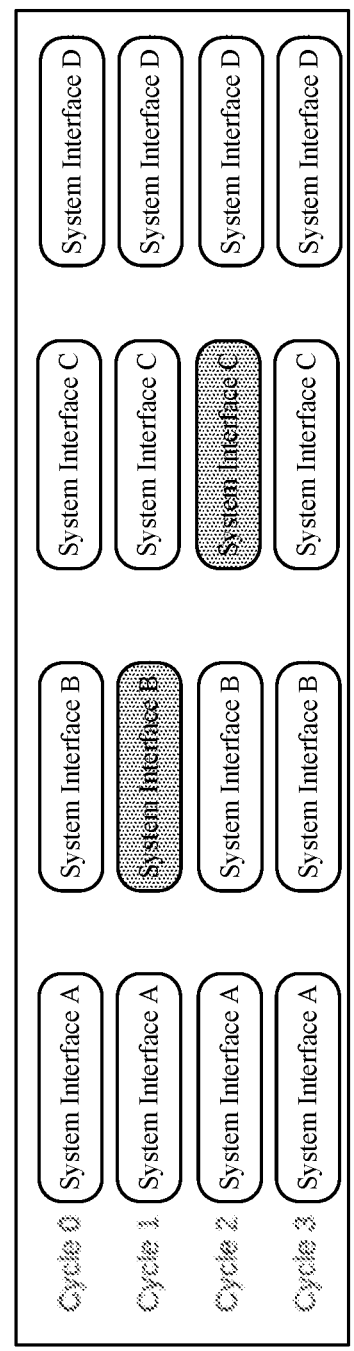
FIG. 5 is a block diagram of a second example of a system implementing error handling according to an error containment mode.

FIG. 5 is a block diagram of a second example of a system implementing error handling according to an error containment mode. In the second example, system interfaces A to D may be like the system interfaces A to D of FIG. 4. At cycle 0, the system interfaces A to D might not have errors. For example, in a lockstep system, they may pass checks for correctness (e.g., no differences detected between outputs at master and checker interfaces for system interfaces A to D), and the response circuitry may enable the master interface(s) to be output to system interfaces A to D (e.g., the transactions are uncontained). At cycle 1, an error, such as a difference between outputs at a master and a checker interface for system interface B, may be detected. With the limited containment mode selected for system interface B, the response circuitry associated with system interface B may cause system interface B to be contained in cycle 1 by disabling system interface B associated with the error (e.g., the current transaction at system interface B is suppressed during cycle 1 based on the difference). The response circuitry associated with system interfaces A, C, and D may continue to enable the master interfaces to be output to system interfaces A, C, and D based on their continuing to pass checks for correctness. Then, at cycle 2, an error, such as a difference between outputs at a master and a checker interface for system interface C may be detected. With the limited containment mode selected for system interface C, the response circuitry associated with system interface C may cause system interface C to be contained in cycle 2 by disabling system interface C associated with the error (e.g., the current transaction at system interface C is suppressed during cycle 2). The response circuitry associated with system interfaces A, B, and D may enable master interfaces to be output to system interfaces A, B, and D based on their passing checks for correctness in cycle 2. Then, at cycle 3, there may be no errors, and the system interfaces A to D may be uncontained. For example, in the lockstep system, the response circuitry associated with system interfaces A to D may enable master interfaces to be output to system interfaces A to D based on their passing checks for correctness (e.g., the transactions resume uncontained). As a result, the limited containment mode caused a containment that was limited to clock cycles on multiple system interfaces in which the errors occurred (e.g., cycle 1 for system interface B, and cycle 2 for system interface C). In some implementations, one or more other modes may be used with respect to other system interfaces (e.g., system interfaces A and D), such as the no containment mode and/or the contain with poison mode.

Figure 6:
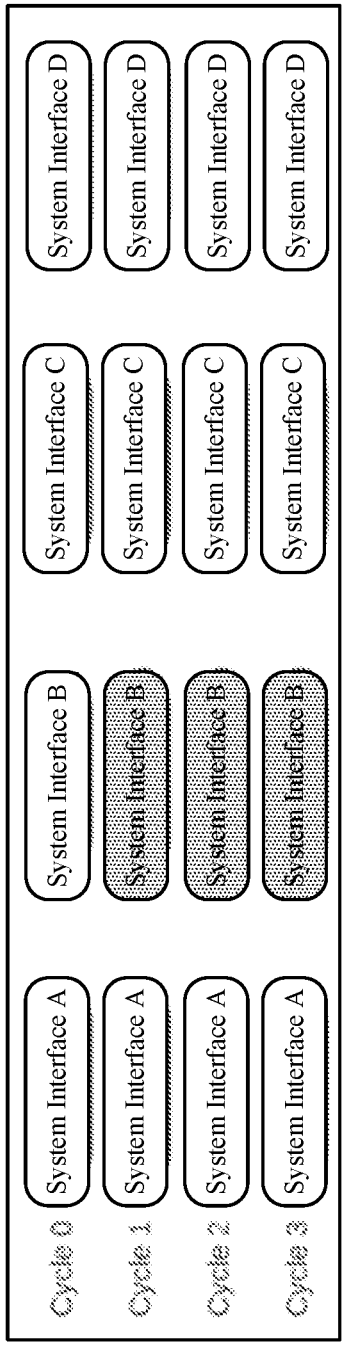
FIG. 6 is a block diagram of a third example of a system implementing error handling according to an error containment mode.

FIG. 6 is a block diagram of a third example of a system implementing error handling according to an error containment mode. In the third example, system interfaces A to D may be like the system interfaces A to D of FIG. 4. At cycle 0, the system interfaces A to D might not have errors. For example, in a lockstep system, they may pass checks for correctness (e.g., no differences detected between outputs at master and checker interfaces for system interfaces A to D), and the response circuitry may enable the master interface(s) to be output to system interfaces A to D (e.g., the transactions are uncontained). However, at cycle 1, an error, such as a difference between outputs at a master and a checker interface for system interface B, may be detected. With a sustained containment mode selected for system interface B, the response circuitry associated with system interface B may cause system interface B to be contained in cycle 1 and cycles thereafter by disabling system interface B associated with the error (e.g., current and future transactions are suppressed at system interface B, regardless of whether the master and checker interfaces continue to be different). The response circuitry associated with system interfaces A, C, and D may continue to enable master interfaces to be output to system interfaces A, C, and D based on their continuing to pass checks for correctness. The system interface B may continue to be contained, for example, until a synchronization event occurs to reset the first circuitry and the second circuitry associated with system interface B. As a result, the sustained containment mode caused a containment that was extended through multiple clock cycles (e.g., cycles 1, 2, and 3), regardless of whether the error occurred in one clock cycle (e.g., cycle 1). In some implementations, one or more other modes may be used with respect to other system interfaces, such as the no containment mode and/or the contain with poison mode. In some implementations, one or more other modes may be used with respect to other system interfaces (e.g., system interfaces A, C, and D), such as the no containment mode and/or the contain with poison mode.

Figure 7:
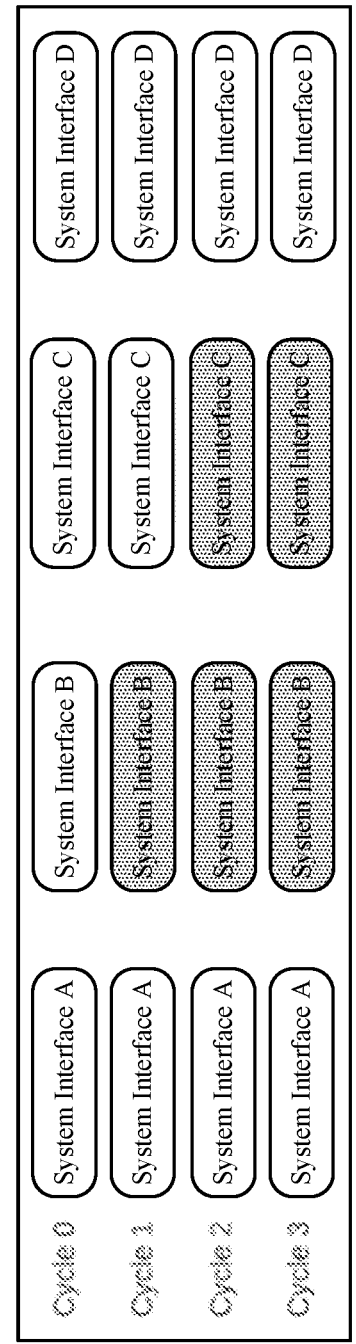
FIG. 7 is a block diagram of a fourth example of a system implementing error handling according to an error containment mode.

FIG. 7 is a block diagram of a fourth example of a system implementing error handling according to an error containment mode. In the fourth example, system interfaces A to D may be like the system interfaces A to D of FIG. 4. At cycle 0, the system interfaces A to D might not have errors. For example, in a lockstep system, they may pass checks for correctness (e.g., no differences detected between outputs at master and checker interfaces for system interfaces A to D), and the response circuitry may enable the master interface(s) to be output to system interfaces A to D (e.g., the transactions are uncontained). However, at cycle 1, an error, such as a difference between outputs at a master and a checker interface for system interface B, may be detected. With a sustained containment mode selected for system interface B, the response circuitry associated with system interface B may cause system interface B to be contained in cycle 1 and cycles thereafter by disabling system interface B associated with the error (e.g., current and future transactions are suppressed at system interface B, regardless of whether the master and checker interfaces continue to be different). The response circuitry associated with system interfaces A, C, and D may continue to enable master interfaces to be output to system interfaces A, C, and D based on their continuing to pass checks for correctness. Then, at cycle 2, an error, such as a difference between outputs at a master and a checker interface for system interface C may be detected. With the sustained containment mode selected for system interface C, the response circuitry associated with system interface C may cause system interface C to be contained in cycle 2 and cycles thereafter by disabling system interface C associated with the error (e.g., current and future transactions are suppressed at system interface C, regardless of whether the master and checker interfaces continue to be different). The response circuitry associated with system interfaces A and D may enable master interfaces to be output to system interfaces A and D based on their passing checks for correctness. The system interfaces B and C may continue to be contained, for example, until synchronization events occur to reset the first circuitry and the second circuitry associated with the system interfaces B and C. As a result, the sustained containment mode caused a containment that was extended through multiple clock cycles on multiple system interfaces in which errors occurred (e.g., cycles 1, 2, and 3 for system interface B, and cycles 2 and 3 for system interface C), regardless of whether the differences occurred in only one clock cycle (e.g., cycle 1 for system interface B, and cycle 2 for system interface C). In some implementations, one or more other modes may be used with respect to other system interfaces (e.g., system interfaces A and D), such as the no containment mode and/or the contain with poison mode.

Figure 8:
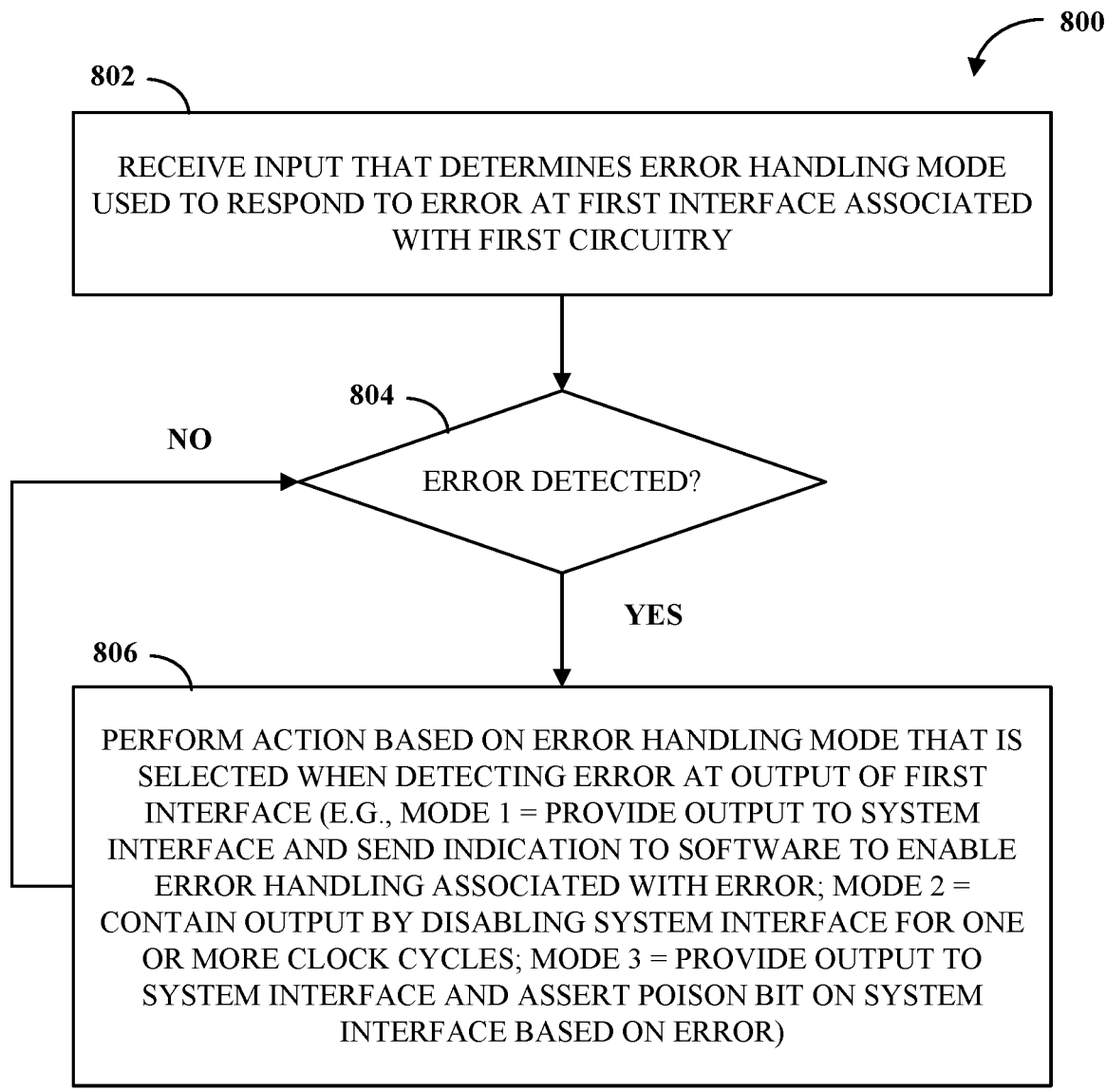
FIG. 8 is a flow chart of an example of a process for determining an error handling mode.

To further describe some implementations in greater detail, reference is next made to examples of methods which may be performed by using a system implementing error handling. FIG. 8 is a flow chart of an example of a process 800 for determining an error handling mode. The process 800 can be performed, for example, using the systems, hardware, and software described with respect to FIGS. 1-7. The steps, or operations, of the process 800 or another technique, method, process, or algorithm described in connection with the implementations disclosed herein can be implemented directly in hardware, firmware, software executed by hardware, circuitry, or a combination thereof. Further, for simplicity of explanation, although the figures and descriptions herein may include sequences or series of steps or stages, elements of the methods and claims disclosed herein may occur in various orders or concurrently and need not include all of the steps or stages. Additionally, elements of the methods and claims disclosed herein may occur with other elements not explicitly presented and described herein. Furthermore, not all elements of the methods and claims described herein may be required in accordance with this disclosure. Although aspects, features, and elements are described and claimed herein in particular combinations, each aspect, feature, or element may be used and claimed independently or in various combinations with or without other aspects, features, and elements.

At step 802, a response circuitry can receive an input selection that determines an error handling mode used to respond to an error associated with an output at a first interface of first circuitry. For example, when used in a lockstep implementation, the error could be a difference between the output being a first output at the first interface associated with the first circuitry and a second output at a second interface associated with second circuitry, identified by comparing the first output to the second output. In other examples, the error could be an ECC error or an error caused by cosmic rays. The response circuitry 306 can receive an input selection that determines an error handling mode used to respond to an error (e.g., a difference between the first output 312 associated with the first circuitry 302 and the second output 314 associated with the second circuitry 304, identified by comparing the first output 312 to the second output 314 of FIG. 3, in the lockstep implementation). The response circuitry can receive an input selection like the input selection 322 of FIG. 3, which could be based on a register setting, an automatic determination based on the interface type (e.g., associated with the system interface 310), or a user input. The error handling mode could be selected from a group of possible modes, such as a no containment mode, a containment mode, a limited containment mode, a sustained containment mode, and a contain with poison mode. In some implementations, the first circuitry could be a first processor core that is a master, and a second circuitry could be a second processor core that is a checker, in a DMR system. In some implementations, the first circuitry could be a first functional unit (e.g., a register file, integer unit, vector unit, ALU, encryption unit, cache, queue, or data path), and a second circuitry could be a second functional unit. In some implementations, the first circuitry could be a leader, and a second circuitry could be a follower. In some implementations, step 802 could be performed in a different order, such as after step 804.

At step 804, the response circuitry can determine whether an error is detected. For example, in a lockstep implementation, the response circuitry can compare the output to a second output to check for correctness. For example, the response circuitry can utilize check circuitry (e.g., the check circuitry 316) that receives the output (e.g., a first output) and a second output and compares the first output to the second output to detect a difference. If the response circuitry does not detect an error (e.g., a difference between the first output and the second output during a clock cycle) ("No"), the response circuitry can return to step 802 to compare the first output to the second output for a next clock cycle.

However, if the response circuitry does detect an error (e.g., a difference between the first output and the second output during the clock cycle) ("Yes"), at step 806 the response circuitry can perform an action based on the error handling mode that is selected (e.g., at step 802) (e.g., based on detecting the error, such as the difference between the first output and the second output in the lockstep configuration). For example, the action could include providing the output to a system interface and sending an indication to software to enable error handling associated with the error when the no containment mode is selected (e.g., mode 1). In another example, the action could include containing at least a portion of the output by disabling at least a portion of a system interface for one or more clock cycles when the containment mode is selected (e.g., mode 2, which could be the limited containment mode or the sustained containment mode). In another example, the action could include providing the output to a system interface and asserting a poison bit on the system interface based on the error when the contain with poison mode is selected (e.g., mode 3).

Some implementations may include an apparatus comprising first circuitry having a first interface; and response circuitry configured to receive an input selection that determines an error handling mode used to respond to an error associated with an output at the first interface. In some implementations, the error handling mode causes the response circuitry to provide the output to a system interface and send an indication to software based on detecting the error. In some implementations, the error handling mode causes the response circuitry to contain at least a portion of the output by disabling at least a portion of a system interface for multiple clock cycles based on detecting the error. In some implementations, the error handling mode causes the response circuitry to contain at least a portion of the output by disabling at least a portion of a system interface for a first clock cycle associated with the error, then provide the portion of the output to the portion of the system interface for a second clock cycle. In some implementations, a system interface of the response circuitry includes a poison bit, and the error handling mode causes the response circuitry to provide the output to the system interface with the poison bit based on detecting the error. In some implementations, a system interface of the response circuitry includes a first poison bit associated with a first portion of the system interface and a second poison bit associated with a second portion of the system interface, and the error handling mode causes the response circuitry to provide the output to the system interface with at least one of the first poison bit or the second poison bit based on detecting the error in connection with the first portion of the system interface or the second portion of the system interface. In some implementations, the response circuitry configures a first error handling mode for a first system interface based on the input selection, and a second response circuitry configures a second error handling mode for a second system interface based on a second input selection. In some implementations, the first circuitry includes a first processor core that is master, and a second circuitry includes a second processor core that is a checker, the master and the checker comprising a DMR system implemented by an SoC.

Some implementations may include a method comprising receiving an input selection that determines an error handling mode used to respond to an error associated with an output at a first interface associated with first circuitry; and performing an action based on the error handling mode that is selected when detecting the error. In some implementations, the action includes providing the output to a system interface; and sending an indication to software to enable error handling associated with the error. In some implementations, the action includes containing at least a portion of the output by disabling at least a portion of a system interface for one or more clock cycles. In some implementations, the action includes providing the output to a system interface; and asserting a poison bit on the system interface based on the error.

Some implementations may include a non-transitory computer readable medium comprising a circuit representation that, when processed by a computer, is used to program or manufacture an integrated circuit comprising first circuitry having a first interface and response circuitry configured to receive an input selection that determines an error handling mode used to respond to an error associated with an output at the first interface. In some implementations, the error handling mode causes the response circuitry to provide the output to a system interface and send an indication to software based on detecting the error. In some implementations, the error handling mode causes the response circuitry to contain at least a portion of the output by disabling at least a portion of a system interface for multiple clock cycles based on detecting the error. In some implementations, the error handling mode causes the response circuitry to contain at least a portion of the output by disabling at least a portion of a system interface for a first clock cycle associated with the error, then provide the portion of the output to the portion of the system interface for a second clock cycle. In some implementations, a system interface of the response circuitry includes a poison bit, and the error handling mode causes the response circuitry to provide the output to the system interface with the poison bit based on detecting the error. In some implementations, a system interface of the response circuitry includes a first poison bit associated with a first portion of the system interface and a second poison bit associated with a second portion of the system interface, and the error handling mode causes the response circuitry to provide the output to the system interface with at least one of the first poison bit or the second poison bit based on detecting the error in connection with the first portion of the system interface or the second portion of the system interface. In some implementations, the response circuitry configures a first error handling mode for a first system interface based on the input selection, and a second response circuitry configures a second error handling mode for a second system interface based on a second input selection. In some implementations, the first circuitry includes a first processor core that is leader, and a second circuitry includes a second processor core that is a follower, the leader and the follower comprising a DMR system implemented by an SoC.

As used herein, the term "circuitry" refers to an arrangement of electronic components (e.g., transistors, resistors, capacitors, and/or inductors) that is structured to implement one or more functions. For example, a circuit may include one or more transistors interconnected to form logic gates that collectively implement a logical function. While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An apparatus comprising:
   first circuitry having a first interface; and
   response circuitry configured to:
      operate in accordance with an error handling mode selected from a plurality of error handling modes, the plurality of error handling modes comprising:
         a first mode corresponding to no output containment,
         a second mode corresponding to at least partial output containment, and
         a third mode corresponding to providing a poison bit; and
      receive an input selection that determines the error handling mode that is selected from the plurality of error handling modes and that is used to respond to an error associated with an output at the first interface.

2. The apparatus of claim 1, wherein the error handling mode causes the response circuitry to provide the output to a system interface and send an indication to software based on detecting the error.

3. The apparatus of claim 1, wherein the error handling mode causes the response circuitry to contain at least a portion of the output by disabling at least a portion of a system interface for multiple clock cycles based on detecting the error.

4. The apparatus of claim 1, wherein the error handling mode causes the response circuitry to contain at least a portion of the output by disabling at least a portion of a system interface for a first clock cycle associated with the error, then provide the portion of the output to the portion of the system interface for a second clock cycle.

5. The apparatus of claim 1, wherein a system interface of the response circuitry includes the poison bit, and the error handling mode causes the response circuitry to provide the output to the system interface with the poison bit based on detecting the error.

6. The apparatus of claim 1, wherein a system interface of the response circuitry includes a first poison bit associated with a first portion of the system interface and a second poison bit associated with a second portion of the system interface, and the error handling mode causes the response circuitry to provide the output to the system interface with at least one of the first poison bit or the second poison bit based on detecting the error in connection with the first portion of the system interface or the second portion of the system interface.

7. The apparatus of claim 1, wherein the response circuitry configures a first error handling mode for a first system interface based on the input selection, and a second response circuitry configures a second error handling mode for a second system interface based on a second input selection.

8. The apparatus of claim 1, wherein the first circuitry includes a first processor core that is master, and a second circuitry includes a second processor core that is a checker, the master and the checker comprising a dual modular redundancy (DMR) system implemented by a system-on-a-chip (SoC).

9. A method comprising:
   operating in accordance with an error handling mode selected from a plurality of error handling modes at least in part by:
      receiving an input selection that determines the error handling mode that is selected from the plurality of error handling modes and that is used to respond to an error associated with an output at a first interface associated with first circuitry; and
      performing an action based on the error handling mode that is selected when detecting the error; and
   wherein the plurality of error handling modes comprises a first mode corresponding to no output containment, a second mode corresponding to at least partial output containment, and a third mode corresponding to providing a poison bit.

10. The method of claim 9, wherein the action includes:
    providing the output to a system interface; and
    sending an indication to software to enable error handling associated with the error.

11. The method of claim 9, wherein the action includes:
    containing at least a portion of the output by disabling at least a portion of a system interface for one or more clock cycles.

12. The method of claim 9, wherein the action includes:
    providing the output to a system interface; and
    asserting the poison bit on the system interface based on the error.

13. A non-transitory, computer-readable medium comprising a circuit representation that, when processed by a computer, is used to program or manufacture an integrated circuit comprising:
    first circuitry having a first interface; and
    response circuitry configured to:
       operate in accordance with an error handling mode selected from a plurality of error handling modes, the plurality of error handling modes comprising:
          a first mode corresponding to no output containment, a second mode corresponding to at least partial output containment, and a third mode corresponding to providing a poison bit; and receive an input selection that determines the error handling mode that is selected from the plurality of error handling modes and that is used to respond to an error associated with an output at the first interface.

14. The non-transitory, computer-readable medium of claim 13, wherein the error handling mode causes the response circuitry to provide the output to a system interface and send an indication to software based on detecting the error.

15. The non-transitory, computer-readable medium of claim 13, wherein the error handling mode causes the response circuitry to contain at least a portion of the output by disabling at least a portion of a system interface for multiple clock cycles based on detecting the error.

16. The non-transitory, computer-readable medium of claim 13, wherein the error handling mode causes the response circuitry to contain at least a portion of the output by disabling at least a portion of a system interface for a first clock cycle associated with the error, then provide the portion of the output to the portion of the system interface for a second clock cycle.

17. The non-transitory, computer-readable medium of claim 13, wherein a system interface of the response circuitry includes the poison bit, and the error handling mode causes the response circuitry to provide the output to the system interface with the poison bit based on detecting the error.

18. The non-transitory, computer-readable medium of claim 13, wherein a system interface of the response circuitry includes a first poison bit associated with a first portion of the system interface and a second poison bit associated with a second portion of the system interface, and the error handling mode causes the response circuitry to provide the output to the system interface with at least one of the first poison bit or the second poison bit based on detecting the error in connection with the first portion of the system interface or the second portion of the system interface.

19. The non-transitory, computer-readable medium of claim 13, wherein the response circuitry configures a first error handling mode for a first system interface based on the input selection, and a second response circuitry configures a second error handling mode for a second system interface based on a second input selection.

20. The non-transitory, computer-readable medium of claim 13, wherein the first circuitry includes a first processor core that is leader, and a second circuitry includes a second processor core that is a follower, the leader and the follower comprising a dual modular redundancy (DMR) system implemented by a system-on-a-chip (SoC).

* * * * *